S. T. HOLLY.
Seed-Planter.
No 499 Reissued Sept. 22, 1857.
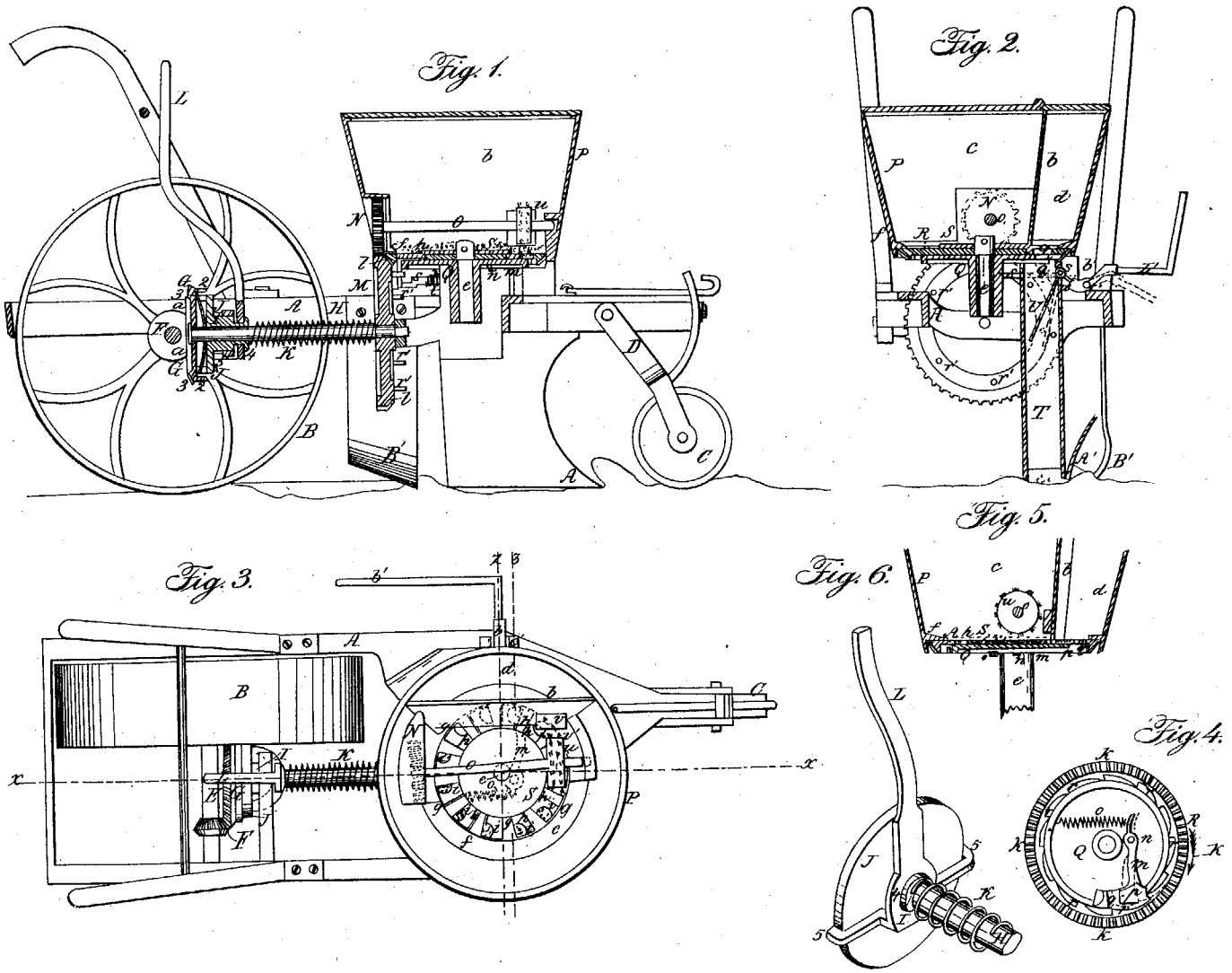
AM. PHOTO-LITHO. CO. N.Y. (OSBORNE'S PROCESS.)

UNITED STATES PATENT OFFICE.

SOLOMON T. HOLLY, OF ROCKFORD, ILLINOIS.

IMPROVEMENT IN SEED-PLANTERS.

Specification forming part of Letters Patent No. 17,568, dated June 16, 1857; Reissue No. 499, dated September 22, 1857.

*To all whom it may concern:*

Be it known that I, SOLOMON T. HOLLY, of Rockford, in the county of Winnebago and State of Illinois, have invented certain new and useful Improvements in Seed-Planting Machines; and I do hereby declare the following to be a full, clear, and exact description of the construction and operation of the same, reference being had to the accompanying drawings, making a part of this specification, in which—

Figure 1 represents a longitudinal vertical section of the machine, the plane of the section passing through the center, as indicated by *x x* in Fig. 3. Fig. 2 represents a transverse vertical section of the same, with the plane of the section passing through the line *y y* of Fig. 3. Fig. 3 represents a plan or top view of the same. Fig. 4 represents a detached inverted plan of the distributing-wheel. Fig. 5 represents a transverse vertical section of the machine, the plane of the section being through the line *z z* of Fig. 3.

Similar letters of reference, where they occur in the several figures, denote like parts of the machine in all of them.

My invention consists, first, in the manner in which I have combined the hand-lever with the clutch and seeding apparatus, so that while the machine is automatic, yet the operator can quicken or retard the dropping of the seed, to cause it to conform to the rows without in any manner injuriously affecting the automatic movement, which will continue from the hand movement at regular intervals until again put out by unevenness in the ground, jarring, or slipping; second, in the peculiar position and action of the valve under the seeding-plate, so that the charges of grain shall all drop instantly, and not be dribbled out, as is usually done in machine-planting; and, thirdly, in the employment or use of an indicator in connection with the valve for letting the seed drop, so as to point or show the exact spot where the seeds are dropped, and thus enable the operator to see whether the planting is properly done, and to quicken or retard the droping, if it is found necessary.

To enable others skilled in the art to make and use my invention, I will proceed to describe the same with reference to the drawings.

A represents the frame of the machine, the back part of which is supported by a wheel, B, and the front end or part by a wheel, C, which is fitted in an adjustable arm, D, attached to the front end of the said frame A. The axle E of the wheel B has a bevel-pinion, F, upon it, and this bevel-pinion gears into a bevel-wheel, G, which is placed loosely on the end of a shaft, H, said shaft being placed longitudinally in the frame A. On the back of the wheel G is formed a flange, 2, that will leave a recess in said back, and in the said recess are placed two or more jointed radial levers, *a*, their outer ends resting against the inner periphery of the flange 2, and their inner or approaching ends slightly raised above or projecting beyond the plane of their outer ends, and through these levers, where they meet at a common center, is made an opening sufficiently large for the shaft H to pass through. On the shaft H is a collar, I, said collar being so connected to said shaft as that it may have a slight longitudinal motion on the shaft, but to turn with the shaft. This collar I has a disk, J, on it, and on the periphery of this disk, and facing the back of the wheel G, is a flange, 3, which fits within the recess formed by the flange 2 on said wheel G, the flange 3 forming a recess for the jointed radial levers *a* to lie in. This flange 3 has also slots cut in it, which receive or lie over the said levers *a*. A helical spring, K, is coiled around the shaft H, one end of said spring pressing against the wheel M on said shaft, and the other end pressing against the collar I to force its disk J against the center or raised portion of the levers *a*, and causing their outer ends to bind by friction in the recess formed by the flange 2, or against the flange itself, sufficiently hard to rotate said disk J, and with it the shaft H, to which it is connected, the several parts forming a clutch.

L is a lever by which the collar I and its several parts forming a clutch may be actuated, the lower end of the lever 4 fitting in a groove in said collar. The lower end of this lever L is also furnished with two prongs or arms, 5, which, when the lever is pushed forward, grip the periphery of the disk J sufficiently tight to enable the operator to give the shaft H a partial rotation, or to stop its motion, as may be required to quicken or retard the dropping of the seed.

The end of the shaft H opposite to the end where the wheel G is attached has a wheel, M, upon it. This wheel M gears into a pinion, N, which is secured on one end of a shaft, O, said shaft being placed in the lower part of a hopper, P, as shown in Figs. 1 and 3. The hopper P is of circular form, and may be slightly conical, and is permanently secured on the frame A. The hopper is divided by a vertical or slightly-inclined partition-plate, *b*, into two compartments, *c d*, as shown in Fig. 2. The compartment *c*, however, is considerably larger than the other one, *d*.

Q represents a circular disk or plate, which is permanently secured at its center to a support, *e*, which support is in turn secured to the frame A. This plate Q may be considered as the bottom of the hopper; but its diameter does not equal that of the bottom of the hopper, and a space is consequently left all around the plate Q and the lower edge of the hopper. On the plate Q a distributing-wheel, R, is placed. This wheel works on the upper part of the support *e* as a center. The outer edge or periphery of the wheel R is fitted to and works under a flange, *f*, at the bottom of the hopper, at its inner edge, as shown in Figs. 1 and 2. The wheel R has radial slots or openings *g* made through it at equal distances apart, as seen in Fig. 3.

S represents a circular plate or wheel, which is placed directly over the wheel R and upon the same center *e*. The edge or periphery of the plate or wheel S has a series of radial projections, *h*, upon it. These projections are fitted in the slots or openings *g* and close them, with the exception of the openings *i*, which are formed by filing recesses in the projections *h*, as seen in Fig. 3. The plate or wheel S rotates with the wheel R. The under side of the wheel R has bevel-teeth *k* upon it, and these bevel-teeth gear into bevel-teeth *l* which are upon the wheel M, said wheel having two sets of teeth formed at its periphery, one set of bevel form, and the other set being parallel with the shaft H, as seen in Fig. 1.

To the under side of the plate Q a lever, *m*, is attached or pivoted at the point *n*, which point is eccentric to the turning-point of the plates or wheels, with which it acts in concert, so that the plate *p*, which is on the outer end of said lever, may at proper periods cover the opening from the hopper to the seed-tube, and then be suddenly drawn back to open it at stated periods, and then closing again for a second succeeding operation, as will be explained. One end of the lever *m* has a spring, *o*, attached to it, and the opposite end has a flat plate, *p*, formed on it, said plate working under an opening, *q*, made in the plate Q, and within the compartment *d* of the hopper.

On the inner side of the rim of the wheel R, on which the bevel-teeth *k* are formed, projections *r* are made, somewhat like ratchet-teeth, (see Fig. 4,) and these projections, as the wheel R rotates, actuate the plate *p*, which is, in fact, a valve, as follows: The shoulders of the proections *r*, in regular succession, catch against the corner of the plate *p* and move said plate on its pivot *n* against the action of the spring *o* until it covers the opening *q*. Now, as the center of motion of the lever *m* is eccentric to the center of motion of the wheels and plates on *e*, the plate *p* approaches the center *e*, or is drawn in toward it by its eccentricity thereto, until the corner of it slips away from the projections *r*. The spring *o* then instantly contracts and suddenly thows the corner of the valve *p* against the next projection *r*, and so on in succession throughout the series.

T represents a conveying-spout, which is secured to the frame A directly underneath the opening *q* in the plate Q. In the upper part of the spout T a valve, U, is placed. This valve is suspended at its upper end within the spout T, and is attached to a rod, *s*, which passes transversely through the spout, and is bent in a right-angular form, so as to be actuated by pins *r'*, attached to the wheel M, near its periphery, and at equal distances apart. The rod *s* has a spiral spring, *t*, placed on it, said spring having a tendency to keep the valve closed. This valve U is used when the corn is planted in hills; but when the seed is drilled in, the valve U may be opened and held open by a pin or otherwise, and then the seed will drop from the seed-cells directly through the spout T into the furrow or drill.

On the shaft O, within the hopper P, a circular brush, *u*, is placed, the edge of which brush bears against a socket, *v*, containing a stationary brush, *v'*, beneath both of which brushes the recesses *i* pass during the rotation of the plate or wheel S.

A' represents the furrow-share, placed directly in front of the conveying-spout T.

B' represents a covering-share placed back of the conveying-spout.

To the rod *s* an arm, *a'*, is attached, and the end of this arm is fitted in the end of a notched bar, *b'*, which works on a fulcrum-pin, *c'*, on the frame A. The bar *b'* serves as an indicator, and shows, when its outer end is depressed, that the valve U is open and the seed allowed to drop, and the object of the indicator is to show the precise spot where the seeds are dropped, so that should they drop in advance or in rear of the exact spot the operator may, by his lever L, quicken or retard the dropping, so as to make it correct.

As the machine is drawn along the distributing-wheel R is rotated by the wheel M on the shaft H, said shaft receiving its motion from the main driving and supporting wheel B through the pinion F and wheel G, the wheel G being connected with the shaft H by means of the spring K and disk J, forming a clutch, as heretofore described. As the distributing-wheel R rotates the apertures *i* become filled with seed, the hopper P having been previously supplied with seed, and as the apertures pass over the aperture or opening *q* in the plate Q the valve or plate *p* is actuated by one of the projections *r* and thrown to one side, or drawn from underneath the opening $q$, and allows the seed to drop down into the spout T, where it is caught and retained by the plate or valve U, (when planting in hills.) This plate or valve U is opened at greater or less intervals, according to the distance or space between the pins $r'$, which may be changed at pleasure, and thus a greater or less quantity of seed may be deposited at a time, as required.

The plate or valve $p$ serves to equalize the dropping of the seed, the backward stroke of its vibrating motion producing an instantaneous opening beneath the apertures $i$, which, in connection with the jarring or concussion of said stroke, produces prompt and regular discharges of the seed, and causes each grain of seed to be deposited at regular distances from each other. The shock of the stroke also starts or loosens up the grain in the hopper and allows the recesses $i$ to receive their charge with more certainty.

When the surface of the ground is very uneven the seed cannot be dropped at equal distances or at the exact spot if an arbitrary movement is given to the distributing-wheel. To compensate for the unevenness of the ground the clutch is employed, so that the motion of the wheel R may be stopped, quickened, or retarded, as may be desired, to effect the proper or regular dropping that is for the time being being done. The indicator shows each time the valve or plate U opens, and the attendant by operating the lever L controls or changes the dropping of the seed, so that it will be planted at the desired spots.

The field is furrowed in one direction before the planter is used, and the seed may be planted in drills by opening the valve or plate U and holding it open, and a varying speed may be given to the distributing-wheel by having several concentric gears on the wheel G and the pinion F, arranged to slide on the axle E, so that the pinion may be placed in gear with either of them. Different plates or wheels S may be used, the projections $h$ of which may have varying sized recesses $i$ made in them, in order to regulate the quantity of seed to be planted or dropped.

The rotary brush $u$ and the stationary brush $v'$ effectually prevent the seed from clogging in the recesses $i$. The rotating brush agitates the seed, while the stationary brush serves partially as a cut-off and partially as a clearer.

That the construction and action of the lever L may be more clearly understood, I have shown by an enlarged view at Fig. 6 some of its more immediate parts and its action and connection therewith, which are not distinctly seen in the other figures, owing to the small scale on which they are drawn.

Having thus fully described the nature and object of my invention, what I claim therein as new, and desire to secure by Letters Patent, is—

1. In combination with a machine that drops its seed automatically, a hand-lever and clutching apparatus that enables the operator to quicken or retard the dropping, so as to bring it to the exact spot, substantially as herein described, and without disarranging or injuriously affecting the automatic movement.

2. In combination with the wheel S, having its center of motion at $e$, and furnished with openings $i$, the lever $m$, with its plate $p$, and hung or pivoted at a point concentric to the point $e$, so that the plate $p$ can cover or be drawn within the range of the openings $q$ at stated intervals, substantially as set forth.

3. The employment or use of the indicator $b'$, connected with the valve U, and arranged and operated as shown, and for the purpose herein set forth.

SOLOMON T. HOLLY.

Witnesses:
A. B. STOUGHTON,
THOS. H. UPPERMAN.